Aug. 17, 1926.
C. N. BARTON
1,596,571
SECTIONAL MACHINERY REPAIR WASHER
Filed Dec. 31, 1920
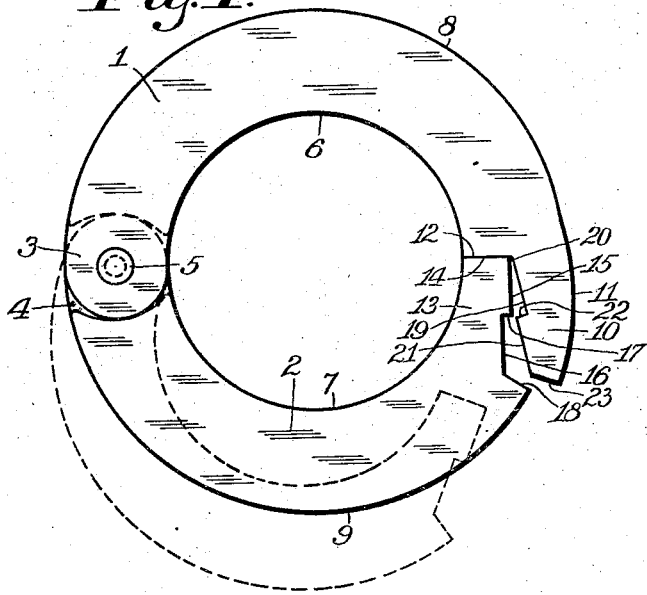
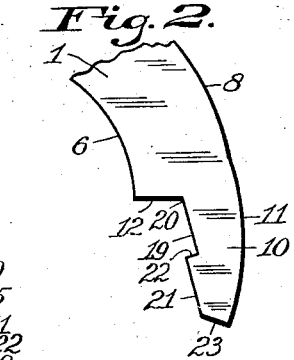
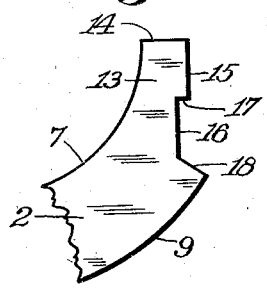
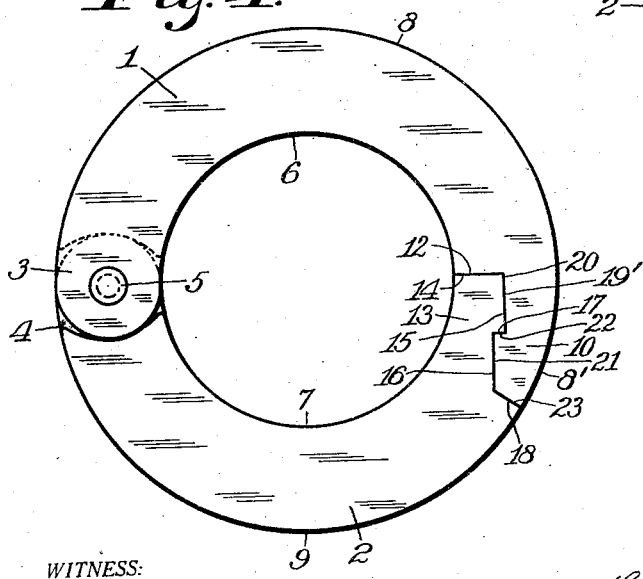
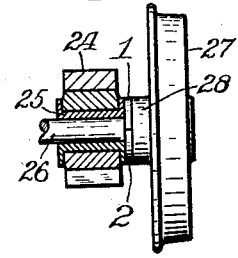
WITNESS:
R. F. Buckley,
M. D. Steele
INVENTOR:
Charles N. Barton,
BY
E. T. Silvius,
ATTORNEY.

Patented Aug. 17, 1926.

1,596,571

UNITED STATES PATENT OFFICE.

CHARLES N. BARTON, OF INDIANAPOLIS, INDIANA, ASSIGNOR TO QUICK REPAIR WASHER CO., OF INDIANAPOLIS, INDIANA, A CORPORATION OF INDIANA.

SECTIONAL MACHINERY-REPAIR WASHER.

Application filed December 31, 1920. Serial No. 434,352.

This invention relates to an improved repair washer of the type that is designed to be placed on a shaft or axle to fill or partially fill the space between end-bearings caused by wearing of parts so as to cause or permit unnecessary play longitudinally of the shaft or axle, the invention having reference more particularly to a washer that is adapted to be readily applied to a machinery shaft or axle without it being necessary to transport the machinery to a work shop or to remove the shaft or axle from its place in the machinery.

An object of the invention is to provide an improved machinery repair washer of the above-mentioned character that shall be so constructed as to be adapted to be readily placed on a rotary shaft or axle to take up or reduce longitudinal motion of the shaft in its bearings, more particuarly where a solid washer cannot be slipped over an end of a shaft to the shaft bearing.

Another object is to provide an improved sectional repair washer which shall be so constructed as to be adapted to closely embrace the shaft or axle on which it may be needed, and which shall have improved locking means to secure the sections of the washer together of such type as will permit practical operation thereof in case the washer must be of large dimensions and when the metal thereof can have only a little or no elasticity necessary to snap-locks.

A further object is to provide an improved machinery repair washer having hinged sections adapted to be securely and permanently locked together in place, and by simple boltless means; which washer may be produced at small cost and be durable and economical in use.

With the above-mentioned and other objects in view, the invention consists in an improved sectional machinery repair washer having novel means for locking the sections thereof together; and, the invention consists also further in the parts and combinations and arrangements of parts or features as hereinafter particularly described and further set forth in the accompanying claim.

Referring to the drawings,—Figure 1 is a plan view of the improved washer as produced in condition to be applied for use; Fig. 2 is a fragmentary plan view of one of the sections of the washer; Fig. 3 is a fragmentary plan view of the companion section of the washer; Fig. 4 is a plan view of the washer having the sections thereof locked together as when in use; Fig. 5 is a fragmentary detail showing a small car wheel and axle supporting a portion of a car frame, to which the improved washer is applied as illustrating one of the purposes and function of the invention.

Similar reference characters in the different figures of the drawings indicate corresponding elements or features of construction herein referred to in detail.

The improved washer as preferabdy constructed comprises two sections 1 and 2 or semi-circular contour, the sections being of uniform thickness throughout excepting that they have relatively thin hinge portions 3 and 4 respectively at one end thereof, the hinge portions being arranged in over-lapping relation and connected together by a suitable pivot 5. The sections or parts of the washer have concavely-curved inner edges 6 and 7 respectively that are each co-extensive with one-half of a circle; and the sections have also convexly-curved peripheral portions or edges 8 and 9 respectively. One of the sections has an extension or tongue 10 that is adapted to be locked to the companion section, and when produced and ready to be locked to the other section the tongue projects from the body portion of a section tangentially and preferably has a curved outer edge 11 that corresponds to the curvature of the edge 8, so that when the tongue is locked to the companion section the edge will constitute a continuation 8' of the edges 8 and 9. The sections are composed of suitable metal, such as tough and flexible brass or other anti-friction metal that will permit of the tongue being bent slightly to effect locking arrangement of the sections. The washer is usually of substantial thickness and large diameter, particularly when required on small car axles commonly used at mines.

More specifically the body portion of each section corresponds in extent circumferentially to one-half circle, so that one section has a squared end portion or shoulder 12 beyond which the tongue 10 extends from the body portion adjacent to the periphery thereof. The companion section is of reduced width adjacent to its locking end so as to have a relatively narrow but yet solid anvil portion 13 which has a squared end 14 to abut against the end portion 12. The portion 13 has an outer edge 15 at approximately right angles to the end 14 and extending a suitable distance from the end, and has also a recess 16 at one end of which is a locking shoulder 17, the opposite end of the recess having an oblique angled end 18 extending from the bottom of the recess to the edge 9. The tongue 10 when not locked to the companion section has an inner edge or recess 19 extending at an obtuse angle from the outer end 20 of the portion 12, and beyond the recess the tongue has an inwardly extending portion 21 to enter the recess 16 and to form a locking shoulder 22 facing toward the end portion 12 to engage the shoulder 17 when the tongue is bent inward, the edge or recess bottom 19 after the tongue is bent representing an inner edge 19' that extends at right angles from the end portion 12 against the edge 15. The tongue has an angular end 23 corresponding to the end portion 18.

In Fig. 5 the numeral 24 indicates a portion of a car frame having a journal box 25 supported on an axle 26 mounted in a wheel 27 having a hub 28 facing the journal box to prevent movement of the journal box along the axle, and the improved washer is shown on the axle between the journal box and the wheel hub to compensate for wear and prevent undesirable movement of the car body longitudinally of the axle.

In practical use, a repair washer of the required thickness to freely enter the space it is to occupy is selected from a stock of washers assumed to be kept on hand. The sections of the washer are swung apart on their hinge connection to permit the free ends to pass over the axle or shaft transversely thereof, and the sections are freely brought together until they embrace the axle or shaft, the locking portions of the sections then appearing as in Fig. 1. The anvil portion 13 of one section being against the axle and the base portion 20 of the tongue being against the end of the edge 15, the edge 11 of the tongue is struck by a hammer or other instrument and the tongue is bent inward until the locking shoulder 22 engages the shoulder 17, with the edge 21 in the recess 16, the washer being then securely locked in place. When lost motion again develops the hinge connection prevents lateral displacement of the locked portions until another washer of suitable thickness may be similarly applied to the axle or shaft against or in lieu of the washer previously applied.

Having thus described the invention, what is claimed as new is—

In a machinery repair washer, the combination of a washer segment having at one end thereof a solid anvil portion squared at its end and of less width radially than the body portion of the segment, the outer edge of the anvil portion having a locking shoulder, a pivot connected to the segment at the opposite end thereof, and a washer segment connected at one end thereof to the pivot and having on its opposite end a tongue projecting from the segment end and having a locking shoulder on its inner edge, said segments being composed of flexible anti-friction metal and said tongue having a base portion that is of a width to enable the tongue to be deformed on the said anvil portion to cause co-engagement of said shoulders.

In testimony whereof, I affix my signature.

CHARLES N. BARTON.